(12) United States Patent
Harris

(10) Patent No.: US 8,160,937 B2
(45) Date of Patent: Apr. 17, 2012

(54) SYSTEM AND METHOD FOR PLACING A PRODUCT ORDER VIA A COMMUNICATIONS NETWORK

(76) Inventor: William F. Harris, Charlotte, NC (US)

( * ) Notice: Subject to any disclaimer, the term of this patent is extended or adjusted under 35 U.S.C. 154(b) by 0 days.

(21) Appl. No.: 12/901,255

(22) Filed: Oct. 8, 2010

(65) Prior Publication Data

US 2011/0029406 A1  Feb. 3, 2011

Related U.S. Application Data

(60) Division of application No. 10/888,396, filed on Jul. 9, 2004, now Pat. No. 7,831,478, which is a continuation-in-part of application No. 09/662,398, filed on Sep. 14, 2000, now Pat. No. 7,333,944.

(51) Int. Cl.
  *G06Q 30/00* (2006.01)
(52) U.S. Cl. .............. 705/26.64; 705/26.41; 705/27.1
(58) Field of Classification Search ............... 705/26, 705/27
  See application file for complete search history.

(56) References Cited

U.S. PATENT DOCUMENTS

| | | | |
|---|---|---|---|
| 4,887,208 A | 12/1989 | Schneider et al. | |
| 4,972,318 A | 11/1990 | Brown et al. | |
| 5,842,178 A | 11/1998 | Giovannoli | |
| 5,913,210 A | 6/1999 | Call | |
| 5,960,411 A | 9/1999 | Hartman et al. | |
| 6,029,141 A | 2/2000 | Bezos et al. | |
| 6,064,979 A | 5/2000 | Perkowski | |
| 6,263,317 B1 | 7/2001 | Sharp et al. | |
| 6,594,641 B1* | 7/2003 | Southam | 705/26.41 |
| 6,618,706 B1 | 9/2003 | Rive et al. | |
| 6,850,903 B2 | 2/2005 | Levine | |
| 2002/0072984 A1 | 6/2002 | Rothman et al. | |
| 2002/0099622 A1 | 7/2002 | Langhammer | |
| 2002/0198818 A1* | 12/2002 | Scott et al. | 705/37 |

OTHER PUBLICATIONS

Internet Archive Wayback Machine, www.archive.org; www.dontforgettotakeyourvitamines.com; Dec. 6, 2003; 3 pgs.

Eric Wieffering, *Middleman surviving challenge of Internet*, startribune.com, METRO Edition; Feb. 6, 2000; <http:/proquest.umi.com/pdgweb?did=49266932&Fmt=3&clientld=19649&RQT=309&VName=PQD>.

* cited by examiner

*Primary Examiner* — Robert M. Pond
(74) *Attorney, Agent, or Firm* — Alston & Bird LLP

(57) ABSTRACT

A system and method for a manufacturer to attract a customer for a distributor, via a public access network, and perform product information and ordering transactions with the customer, where payment is made to the manufacturer by credit card or from another financial account maintained by or on behalf of the customer and where the manufacturer subsequently pays the distributor and an associated manufacturer's representative. The system and method includes the customer submitting a price/quotation request or product order to a host system via the public access communications network. The host system interacts with the customer, the manufacturer, the distributor (who provides purchase order information) and a third party who provides financial approval in order to fulfill the customer request. The host system also interacts with the manufacturer, customer, distributor, manufacturer's representative and third party who provided financial approval to fulfill the order.

10 Claims, 11 Drawing Sheets

SYSTEM AND METHOD FOR PLACING A PRODUCT ORDER VIA A COMMUNICATIONS NETWORK

CROSS-REFERENCE TO RELATED APPLICATIONS

This application is a divisional of U.S. patent application Ser. No. 10/888,396, filed Jul. 9, 2004 now U.S. Pat. No. 7,831,478, which is continuation-in-part of U.S. patent application Ser. No. 09/662,398, filed Sep. 14, 2000 now U.S. Pat. No. 7,333,944.

BACKGROUND OF THE INVENTION

This invention relates to a computer system and method for placing product orders, and more particularly, to a system and method for ordering products over a wide area communications network, such as the Internet.

In order to sell their products to customers, manufacturers typically employ a chain of manufacturer's representatives and distributors. The manufacturer's representatives make sales calls on the distributors to encourage them to carry the manufacturer's products. The distributors stock and sell the manufacturer's products and advertise these products. Further, the manufacturer's representatives make sales calls on customers, such as contractors who utilize the products and designers who specify the products, to encourage them to purchase or specify the manufacturer's products. For example, the customers of a lighting manufacturer's products, such as lighting fixtures, include: architects, engineers and designers who specify the lighting requirements for various projects; contractors; corporations; military buying services; retail consumers; and wholesalers and other similar accounts.

The customers have a number of options when desiring to purchase products. They may directly contact the distributor to purchase the products, or they may work with the manufacturer's representative. These contacts may be in person, over the phone, via facsimile documents, or over a communications network such as the electronic mail and World Wide Web protocols of the Internet. As "surfing" the Web becomes increasingly popular, increasing numbers of customers are becoming comfortable with inquiring about and ordering products over the Web. Businesses are aware of this trend, and as such a potential customer surfing the Web is exposed to dramatically expanding options in purchasing a product.

With the relative low cost of establishing a website and offering products for sale, many manufacturers are foregoing the traditional sales and distribution methods in favor of direct marketing on the Web. In many of these instances, the manufacturers replace the distributors and manufacturer's representatives with the direct marketing website. This creates a number of problems, however, as the manufacturer is then solely responsible for promoting and distributing its own products. Further, when problems with a product arises in the field, the service traditionally provided by the manufacturer's representative is no longer available, leading to further problems for the manufacturer. Additionally, by dropping the distributors and manufacturer's representatives, the manufacturer losses a lot of contact points for promoting their product.

Realizing these disadvantages, some manufacturer's offer products both through the traditional chain of distributors and representatives, as well as directly on a website. The problem with this scenario, however, is that the distributors and representatives view the direct sales website as a competitor, and a threat to their own business. Thus, by implementing this structure, manufacturers are damaging the morale and cooperativeness of their own business associates. The distributors and representatives may then begin to favor the products of other manufacturers and may more aggressively promote and sell these other competing products, to the detriment of the manufacturer that has begun direct marketing.

BRIEF SUMMARY OF THE INVENTION

Thus, there is a particular need for a manufacturer to increase the level of promotion of their products while still retaining, integrating and providing incentives to distributors and manufacturer's representatives. As such, a system and method are provided according to the present invention for facilitating direct marketing by a manufacturer, such as via a website accessible by customers via a communications network, while paying distributors and manufacturer's representatives in a comparable manner to that in which the distributors and manufacturer's representatives are accustomed when participating in conventional transactions. Thus, the system and method of the present invention should not disintermediate distributors and manufacturer's representatives, but should increase the loyalty of such distributors and manufacturer's representatives to the manufacturer since the manufacturer is essentially providing an additional marketing tool to these entities.

In accordance with one embodiment of the present invention, a method and system for generating an order for a product are provided which include receiving, on behalf of a manufacturer and generally by means of a receiver component, a request to order a product from a customer that includes a product code that identifies one product and a customer identification that identifies a customer. According to this embodiment, financial authorization is also received, such as by means of the receiver component, from a third party regarding customer payment for the ordered product. Information for the identified product including an associated customer price is then retrieved from a data storage medium by means of an order placement component. An order is subsequently placed from the manufacturer of the identified product, such as by means of the order placement component, based upon the retrieved information. The purchase of the product is then completed, such as by means of an order fulfillment component, in accordance with the order placed with the manufacturer. When completing the purchase, arrangements are made for shipping by the manufacturer and payment of a portion of the customer price to the distributor even though the order is originated, received and fulfilled in a manner independent of the distributor. Commission may also be provided to an agent associated with the manufacturer, such as by means of a commission component, even though the order is originated, received and fulfilled in a manner independent of the agent.

According to another embodiment of the present invention, a method and system are provided for generating an order for a product that receives, on behalf of a manufacturer and generally by means of a receiver component, a request to order a product from a customer including a product code that identifies the product and a customer identification that identifies a customer. Purchase order information is then obtained, such as by a means of an order placement component, from a distributor of the identified product and an order is placed with the manufacturer of the identified product, again typically by the order placement component. The purchase of the product is then completed, such as by means of an order fulfillment component, in accordance with the order by arranging for shipping by the manufacturer and in association with the purchase order information obtained from the distributor even though the order is originated, received and fulfilled in a manner independent of the distributor.

A commission may also be provided, such as by means of a commission component, to an agent associated with the manufacturer, such as a manufacturer's representative, even though the order is originated, received and fulfilled in a manner independent of the agent.

By compensating the distributor and, in some embodiments, the manufacturer's representative for orders received by the host system and therefore directly by the manufacturer, manufacturers are capable of direct marketing the products without disenfranchising the distributors and manufacturer's representatives. As such, the distributors and manufacturer's representatives should continue to promote and sell the manufacturer's products in the same manner as before, if not in an improved fashion since the direct marketing provided by the manufacturer effectively serves as an additional marketing tool for the distributors and the manufacturer's representatives.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
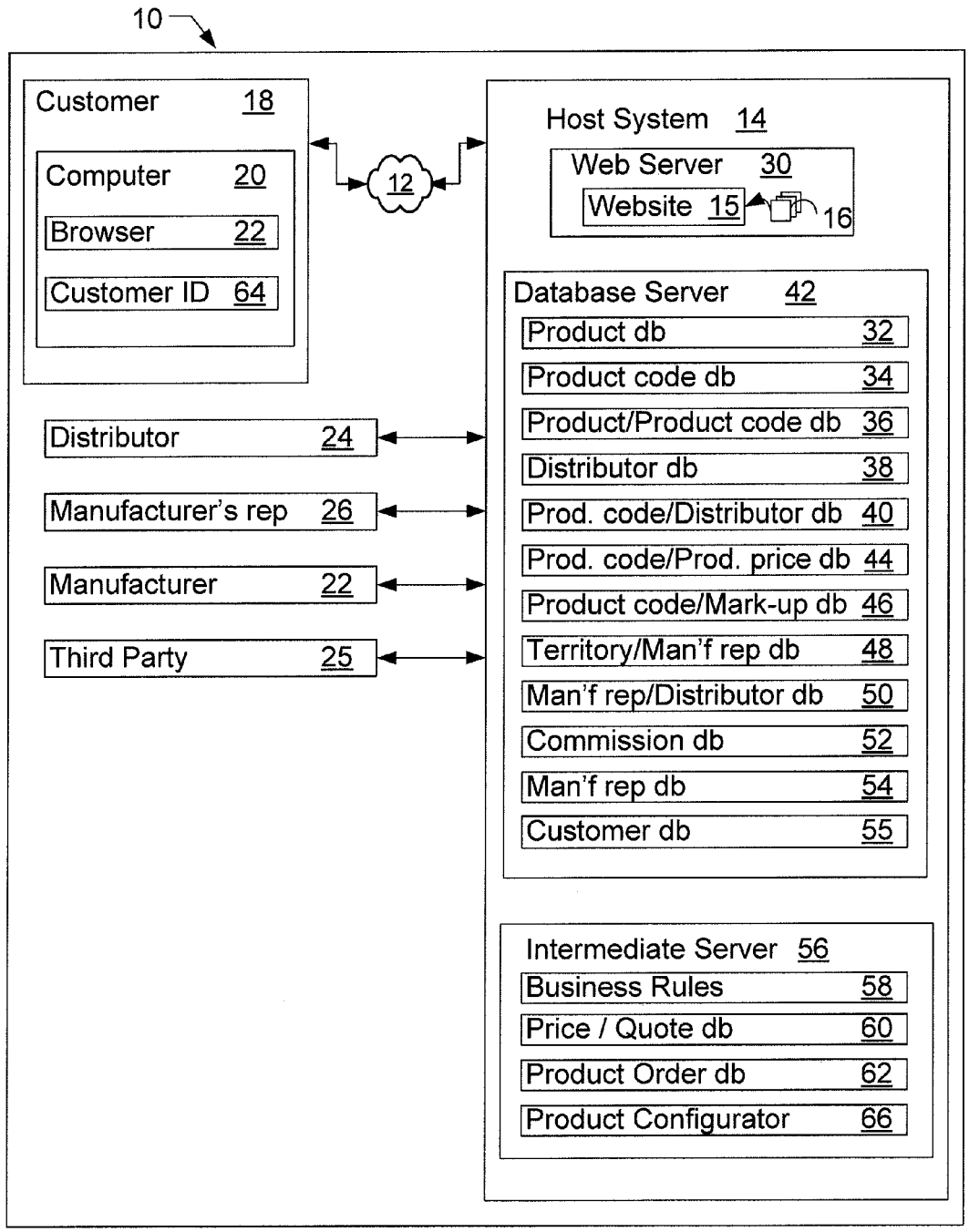
FIG. 1 is a schematic representation of one embodiment of a system for receiving a quotation and placing a product order via a communications network.
Figure 2:
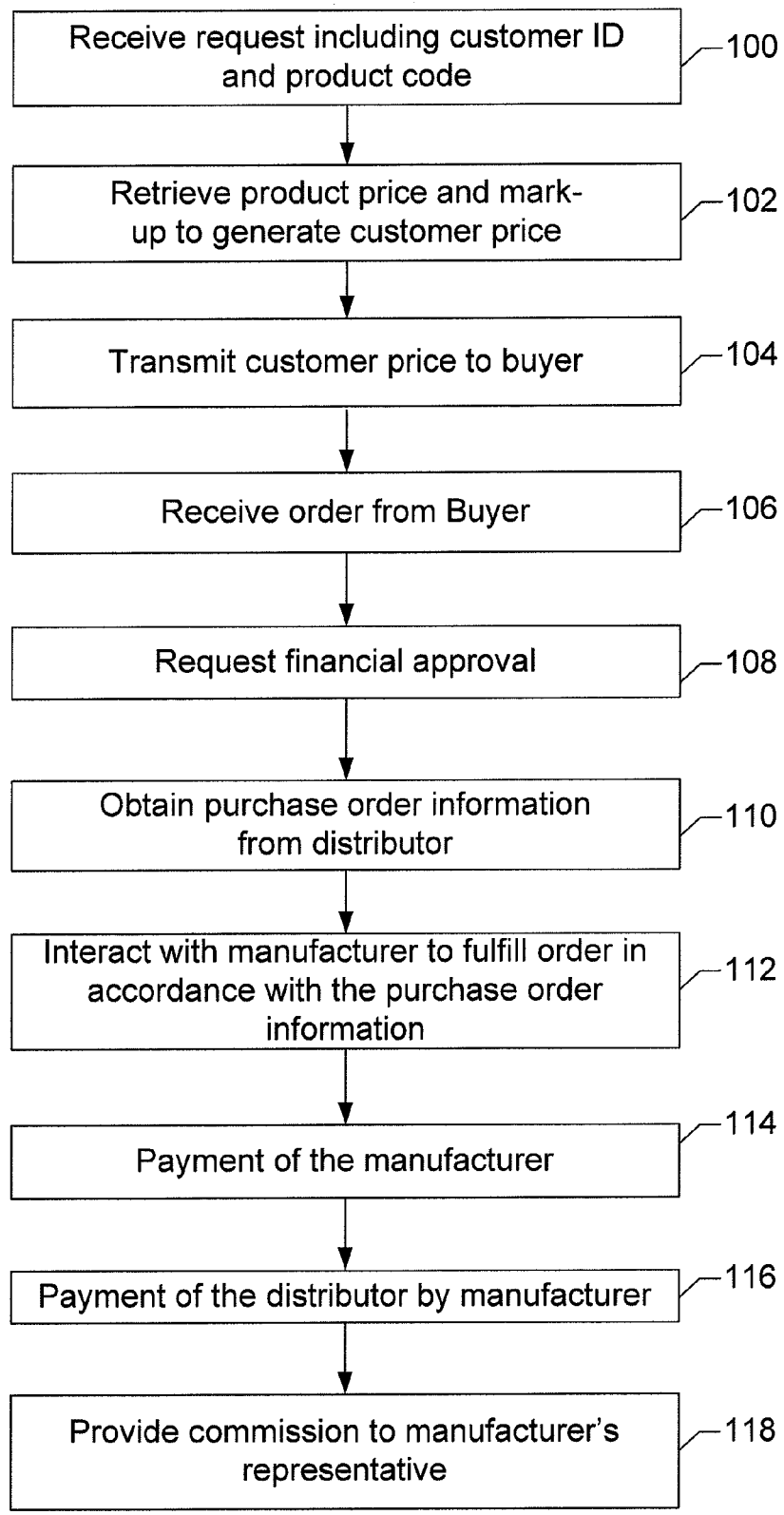
FIG. 2 is a flow chart of one embodiment of a method for placing a product order via a communications network.

Referring to FIGS. 1 and 2, one embodiment of a system for processing requests for product pricing information and product orders via a communications network 12, while integrating the request with a traditional product distribution chain, includes a host system 14 that provides a website 15 promoting products for sale via interactive web pages 16. The host system 14 receives the request, including a customer identification and a selected product code, from a customer 18 interacting with the web pages 16 that are provided over a wide area communications network 12, preferably a public access network such as the Internet, and displayed on a computer 20 using a browser 22 (Block 100, FIG. 2). The host system 14 retrieves a product price utilizing a predetermined pricing function based on the product code and a mark-up based on the customer identification. The product price and mark-up are combined into a customer price, which is transmitted to the customer 18 (Blocks 102 and 104). Further, the host system 14 may interact with a distributor 24 of the product, who is selected from a plurality of distributors through specific identification by the customer or through automatic identification by analyzing the data in the request. In this embodiment, the distributor 24 acknowledges whether the customer 18 is a customer of the distributor, if so indicated by the request, in order for the host system 14 to determine the customer price. Additionally, if the customer 18 submits an order to purchase the product (Block 106), the host system 14 solicits financial approval (Block 108), such as from a credit card clearinghouse 25. Assuming that financial approval is obtained, the host system 14 may notify the manufacturer who may then solicit purchase order information, such as a purchase order number, from a distributor (Block 110). The host system then processes the order and arranges for the manufacturer to ship the product pursuant to the purchase order number provided by the distributor (Block 112).

The source of the funds for the customer, such as the bank or other financial institution that issued the credit card, pays the manufacturer, either following shipment as shown in Block 114 or prior thereto. The manufacturer then pays the distributor that issued the purchase order information and, in at least some instances, provides a commission based on a predetermined commission function to a manufacturer's representative 26 (Blocks 116 and 118). The manufacturer's representative 26, who is selected from a plurality of representatives, is associated with the order through the information in the order, such as the product and/or through a territory corresponding to the location of the customer 18. Further, the manufacturer's representative 26 is typically responsible for the sales and service of the product in the territory. Thus, the system and method provide a manufacturer-sponsored website for the direct pricing/ordering of products, with the distributor receiving payment for its issuance of purchase order numbers and with order-based commissions provided to a manufacturer's representative.

The website 15 of the host system 14, in one embodiment, primarily promotes the products associated with a single manufacturer 28. As such, the website 15 provides a co-marketing vehicle between the manufacturer and its associated distributors and representatives. The manufacturer-specific website allows the manufacturer to independently promote its own products, as opposed to a distributor website that may include the manufacturer's products along with a competitor's products. By integrating this manufacturer-specific website with the traditional sales and distribution chain, the manufacturer gains an additional, focused marketing tool that rewards the traditional players in the sales and distribution chain while reducing the burden on these players. Pricing requests and product orders are handled primarily through the host system 14, requiring only customer account confirmation from the distributor and product order financial approvals from a third party 25, such as a credit card clearinghouse, while compensating the distributor and rewarding the manufacturer's representative with a commission on the order. The system and method herein may provide relief to the distributor from having to carry inventory to fill the order and the associated inventory carrying costs, such as for taxes, insurance and security. Further, the system and method herein may relieve the distributor of most of the logistics associated with filling the order, as the manufacturer handles the shipment logistics. Further, by providing a commission to the manufacturer's representative, the manufacturer's representative experiences expanded sales in their territory without expending any cost or effort. The commission based on the sales provided by the system and method herein thereby give the manufacturer's representative an incentive to initiate or continue providing service to the customer. Thus, the present system and method provides the manufacturer with an additional marketing outlet, which the manufacturer can control, without alienating the traditional participants in the distribution chain, and thereby retaining the inherent benefits provided by these business associates or agents.

In the architecture of the system 10, the host system 14 includes one or more computer servers each having processors, data storage medium, receiving components and transmitting components for the processing, storing, input and output of data, signals and business rules for performing the customer price information and product order transactions.

For example, referring to FIG. 1, the host system 14 may include a web server 30 or other computing device for storing and generating the web pages 16 and for parsing the data of the incoming request for use by the rest of the host system 14. In generating the web pages 16 and performing other associated tasks, the web server 30 accesses a variety of information.

The host system 14 may also include a data storage medium, such as one or more database servers 42 including various databases and tables utilized in processing the transactions. For example, the web server 30 may interact with the database server 42 that includes a product database 32 storing of all the information about the products available from the manufacturer 28, a product code database 34 storing of all the identifiers of products, a product/product code database 36 associating the various products with their corresponding product code, a distributor database 38 storing all of the information about the distributors of the products including, among other things, a listing of the products carried by the distributor and the distributor price for the products which represents the difference between the customer price for a product and the distributor's gross profit that is paid to the distributor by the manufacturer as described below. In this regard, the distributor price is akin to the price paid by the distributor to the manufacturer for a product stocked by a distributor in a conventional sales/distribution system. The database server 42 may also include a product or product code/distributor database 40 associating the product or product code with the one or more distributors that supply the product. Additionally, for example, the database server 42 may include: a product or product code/product price database 44 associating a price with each product; a product or product code/mark-up database 46 associating a predefined mark-up factor or amount to multiply by or add to the product price of each product; a territory/manufacturer's representative database 48 associating a given geographical territory with each manufacturer's representative; a manufacturer's representative/distributor and/or manufacturer database 50 associating a manufacturer's representative with a distributor with whom the representative is working; a commission database 52 storing information relating to calculating and crediting commission amounts to each manufacturer's representative and tables associating a commission rate or percentage or factor with the manufacturer's representative and the distributor and/or manufacturer; a manufacturer's representative database 54 storing of all the information about each of the manufacturer's representatives; and a customer database 55 storing all of the information about the customer, as well as customer preferences such as preferred distributors and the associated customer account numbers.

Further, the host system 14 may include an intermediate server 56 including business rules 58 for performing the various transactions, a price/quote database 60 storing information related to each request for price or request for quotation, and a product order database 62 storing information related to the content and fulfillment of the purchase orders. The intermediate server 56 may further include a product configurator 66, which is a software module that interacts with the customer and with the data within the host system 14 to assemble a product and product options into predefined product configurations for ordering purposes.

Although shown as three separate servers, the web server 30, database server 42 and intermediate server 56 may be combined into a single server. Additionally, although the host system 14 is described as having the data and processing capabilities for performing the methods of the present invention, the computer 20 of the customer 18 may share some of these tasks. Thus, the servers of the host system 14 of one embodiment include all of the software and the data and data relationships for the host system 14 to determine a customer price for a product based on the identified distributor, as well as determining a commission and a manufacturer's representative to credit based on an order.

Figure 4:
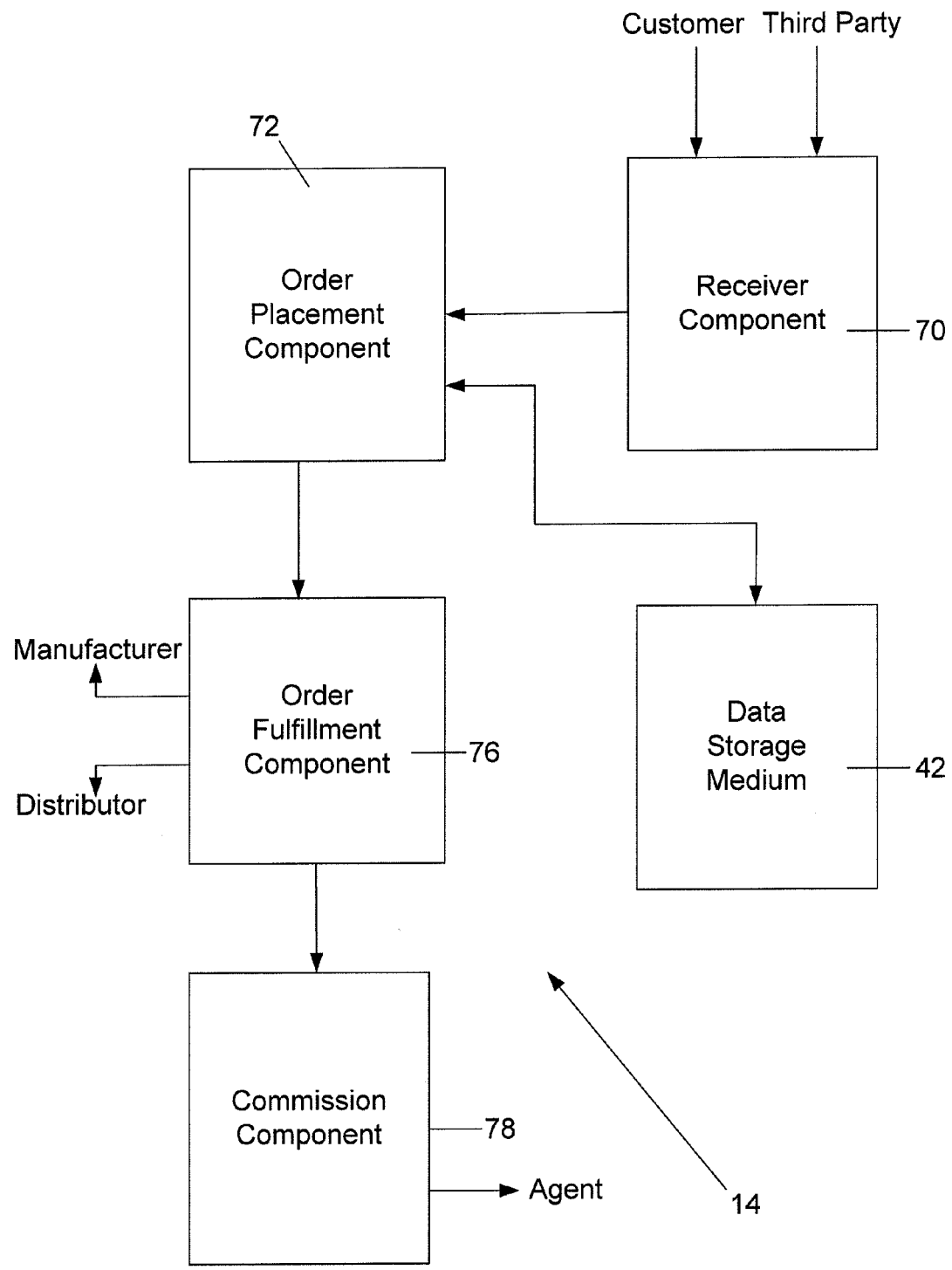
FIG. 4 is a block diagram of a host system of one embodiment of the present invention.

One embodiment of a host system 14 is shown in FIG. 4. As described in detail herein below, the host system 14 may include a receiver component 70 for receiving on behalf of a manufacturer 28, a request to order a product from a customer 18 and for receiving financial authorization from a third party 25, a data storage medium 42 for storing information about a plurality of products as well as other information as described above, an order placement component 72 for retrieving information about a product requested by a customer and for using the retrieved information to place an order from the manufacturer of the identified product and an order fulfillment component 76 for completing the purchase of a product in accordance with the order placed by the order placement component 72 including arrangement for shipping by the manufacturer and payment of a portion of the price to the distributor even though the order is received and fulfilled in a manner independent of the distributor. As also described below, the host system may include a commission component 78 for providing a commission to an agent, such as a manufacturer's representative 26, associated with the manufacturer. As described above, the receiver component 70, the order placement component 72, the order fulfillment component 76 and the commission component 78 may be comprised of a single server or other computing device or may be comprised of a plurality of servers or other computing devices with the respective functions of these components performed by individual servers or other computing devices or distributed manner across multiple servers or other computing devices. In any event, the servers or other computing devices generally operate under control of a computer program product for performing the functions described herein.

As mentioned above, the system 10 is preferably sponsored by a single manufacturer 28, although it is possible that more than one manufacturer may join together in offering their products on the website 15. For example, manufacturers with complementary products may jointly promote the website 15 in order to offer a potential customer a more complete selection of products from which to choose. For example, a light fixture manufacturer promoting the website 15 may join together with one or more manufacturers of complementary products, such as lamps or ballast. Other arrangements of manufacturers joining together may also be utilized. The manufacturer 28 generally produces a selection of products that may be offered for sale directly by the manufacturer, or through a sales and distribution chain incorporating, for example, manufacturer's representatives 26 or other marketing/sales agents and distributors 24 or other resellers. For example, in the lighting industry, one manufacturer is W.F. Harris Lighting of Monroe, N.C.

The customer 18 may be any potential product specifier, purchaser or anyone interested in a product produced by the manufacturer 28. For example, the customer 18 may be a designer who specifies products, a commercial customer or a retail customer. Customers who specify a product include, for example, designers, engineers and architects. A commercial customer is a customer who qualifies to purchase a product at a discount because they are a reseller of the product and/or because they purchase large quantities of the product. An example of commercial customer in the lighting industry, for example, includes contractors. In contrast, a retail customer is a consumer, generally without industry ties and generally making a one-time, small quantity purchase.

In the system 10, one or more customers 18 may interact with the host system 14 at any one time. The customer 18 provides an identity to the host system 14 using a customer identification 64. The customer identification 64 may be one or a combination of data such as: the customer's name; the customer's address or location, including one or more of the street name, city, state, zip code, county and country; an account number, where the account number includes the customer's account number with a distributor, or where the account number includes a financial account, such as a credit, debit, charge, savings or checking account, with a financial institution, or where the account number includes a contractor number or a specifying architect/engineer/designer number; an Internet protocol (IP) address, which may indirectly include the customer's location; a biometric identifier, such as based on a fingerprint, iris, eye, face, handwriting, and other similar biometrics; and any other unique alphabetic, numeric or alphanumeric code, such as a website-specific name and password that identifies the customer.

The distributor 24 is one of a plurality of entities that resell the product or products of the manufacturer 28. The distributor 24 also may promote the products of the manufacturer 28 to potential customers 18. Usually a manufacturer 28 is associated with a number of distributors 24 in order to increase the scope of marketing of their product. Typically, the distributor 24 keeps an inventory of the manufacturer's products and makes that inventory available to the customer 18 in a typical sales/distribution chain transaction, however, that inventory is not required or utilized by the present invention.

In a traditional sales/distribution chain transaction, for example, the distributor gives the customer a customer price for a product. The distributor-quoted customer price includes a product price plus a unique mark-up, where the product price may be the price the distributor paid for the product and the unique mark-up includes a distributor-specific additional amount the distributor charges for the product to cover their expenses and profit. If the customer wants the product, the customer submits an order to the distributor, and the distributor ships the product from inventory to the customer and bills the customer. The customer pays the distributor, while the distributor had previously paid the manufacturer for the product after receiving it into inventory. In this traditional scenario, the distributor incurs costs, such as taxes and overhead on the inventory of the product. Further, the distributor incurs cost in marketing and promoting the product, as well as in managing the order process and arranging the delivery and delivering the product, and further including the cost of carrying inventory. Additionally, distributors incur the risk of stocking items into inventory that are, in fact, never sold. Hence, distributors may be reluctant to place innovative products into inventory, however desirable they may be.

By way of example of the flow of money in a traditional sales/distribution chain transaction, upon a sale of a product to a customer for a customer price of $20, the distributor will receive $20 from the customer. Either before or after the sale, the distributor pays the manufacturer the amount that the distributor has been invoiced by the manufacturer, such as $18 in this example. As such, the distributor retains its gross profit, such as $2, from the customer price paid by the customer to the distributor.

The present system 10 and method allows the distributor 24 to avoid many of these costs on the incremental sales provided herein, however, as the host system 14 manages the majority of transactions involved in the request for pricing information and product orders from the customer 18. The distributor 24 is primarily involved, if at all, in the aspect of issuing purchase order information, such as a purchase order numbers, to the manufacturer for use in processing and shipping a product purchased by the customer through the host system 14. The distributor 24 may also interact with the host system 14 to confirm whether or not the customer 18 qualifies for special pricing. Thus, the distributor avoids all of the inventory and product delivery costs while being able to make money by issuing purchase orders utilized in product sales with which the distributor is not directly involved.

The manufacturer's representative or agent 26 is one of a plurality of individuals or organizations associated with the manufacturer 28 that market and sell their products. A manufacturer's representative 26 may have an exclusive contract to represent the products of only one manufacturer, or they may be independent and represent a number of competing manufacturers. Additionally, there may be various manufacturer's representatives 26 in a given territory, such as a distributor representative, a showroom or commercial representative, etc. Further, the manufacturer's representative 26 typically has a contract with the manufacturer 28 that establishes a commission to be paid to the representative for generating orders/sales of the products. For example, the manufacturer's representative 26 may have a commission equal to a percentage of the price paid by the distributor to the manufacturer for the product, or equal to a flat rate for each sale, where the percentage or rate may vary depending on the distributor, manufacturer and/or product.

The system 10 for processing requests for product pricing information and product orders now will be further described with reference to lighting products. The system and methods of the present invention may be utilized with any other commercially- or retail-available products, however, where it is desirable for a manufacturer to establish additional marketing opportunities for its products while maintaining and integrating the distributors and manufacturer's representatives or other business associates who otherwise participate in a typical marketing/distributor chain.

Figure 3:
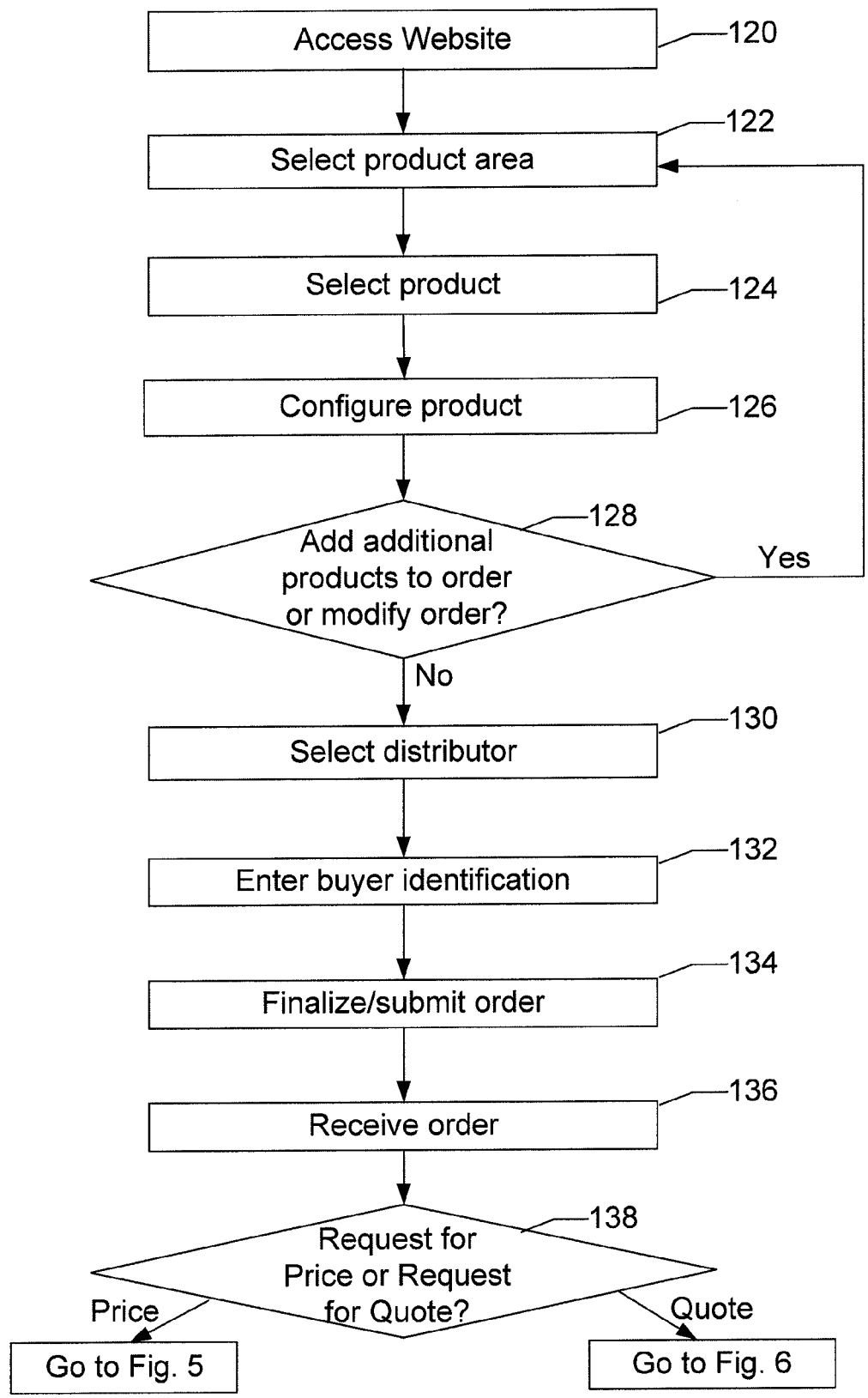
FIG. 3 is a flow chart of one embodiment of the initiation of a request for price or request for quotation process.

In one exemplary embodiment of a system and method for processing requests for product pricing information and product purchase orders, referring to FIGS. 1 and 3, a customer 18 accesses the web pages 16 of the website 15 generated by the host system 14 (Block 120). As shown in FIG. 4, the host system 14 may include a receiver component 70 for receiving requests to order the product and for receiving other related information such as financial authorizations as described below. In order to have complete access to all of the functionality of the website 15, the customer 18 may need to enter a name and password to log in. For example, a commercial customer or other previous user may enter identification information to gain access to special ordering screens or to automatically recall previously-saved information. In contrast, a retail customer or another first time visitor to the website 15 may be allowed to browse through predefined pages 16 and retrieve product information and pricing without requiring any identification information. Preferably, the website 15 promotes products of only the manufacturer 28, and includes information and data that fully describe the product to the customer 18 in order to answer questions the customer may have in making the pricing or purchasing decision. Further, the website 15 may be organized by product or by groups of products. The customer 18 may select a product area (Block 122) that displays a group of related products to narrow down their search for a particular product. Alternatively, the customer 18 may directly select a particular product within the website 15. Still further, the website 15 may be organized by distributor such that a customer 18 may select a distributor from which the customer desires to purchase a product. After selecting a distributor, the customer can browse the products offered by the distributor and can then select one or more products. The customer can similarly browse the product offerings of the host manufacturer that are carried by other distributors, if desired.

Once a desired product is found, then the customer selects the product (Block 124) and adds it to their request or order. For example, in viewing information on a product, the customer may select an order button displayed on the web page which automatically enters the product into an order. If the product selected by the customer 18 includes options and/or accessories, the host system 14 may prompt the customer to configure the product for example, by utilizing the product configurator 66 (Block 126). For example, the host system 14 may display web pages 16 to the customer showing the options and/or accessories, requiring the customer 18 to select a preferred option/accessory to complete the product selection. Once the product configuration is complete, the host system 14 may give the customer 18 the option to continue shopping so that additional products can be entered onto the order or so that the just-entered order can be modified, or to finalize and submit the order (Block 128). If the customer 18 indicates a preference to continue shopping, then the customer may select an area within the website 15, such as another product area, to continue shopping. If the customer 18 indicates the desire to finalize and submit the order, then the host system 14 may require the customer to select one from a plurality of distributors 24 (Block 130) and enter customer identification 64 (Block 132), if the customer has not already selected a distributor in the process of selecting the product.

If the customer has not selected a distributor in the process of selecting a product, the selection of the distributor 24 (Block 130) may not be required, however, depending on information contained with the customer identification 64 or depending on whether the customer 18 is making a request for price or a request for quote, as are discussed below. For example, if the customer 18 is a previous visitor to the site and has stored a distributor preference on the host system 14 such as in the customer database 55, then the host system may retrieve this information automatically. Other information previously-stored on the host system 14 and associated with the customer 18 may include other preferences and information, such as the customer's customer account number associated with the indicated distributor and the customer's name and password for accessing the website. Further, for example, if the customer 18 is a retail customer and is only making a request for price, then the host system 14 may retrieve from the distributor database 38 the distributor that is geographically located nearest to the customer based on the customer information 64. Alternatively, for example, if the customer 18 is a retail customer and is only making a request for price, then the host system 14 may not require a distributor association until a purchase order is entered, if a distributor is not automatically selected, and thus may merely retrieve a standard retail mark-up from the database server 42. Alternately, the system 10 may allow the customer 18 to enter multiple distributor identifications to enable the customer to efficiently make price comparisons.

Upon finalizing the order, the customer 18 submits it to the host system 14 and, in particular, the receiver component 70 (Block 134), indicating a request for price (RFP) or a request for quotation (RFQ). In a RFP transaction, the customer 18 is querying the host system 14 for a customer price for an identified product. Typically, the customer price will vary depending on the distributor and depending on whether or not the customer has an account with the distributor. The RFQ transaction may be utilized by a customer 18 to compare product pricing from various distributors prior to initiating an order. An RFQ is a special case transaction, where the customer believes a product price other than the usual customer price should be associated with an order. For example, a contractor ordering a large quantity or an unusual product configuration may utilize the RFQ transaction. The receiver component 70 receives the request and stores a copy in the price/quote database 60 (Block 136), and then determines if it is an RFP or an RFQ (Block 138).

Figure 5:
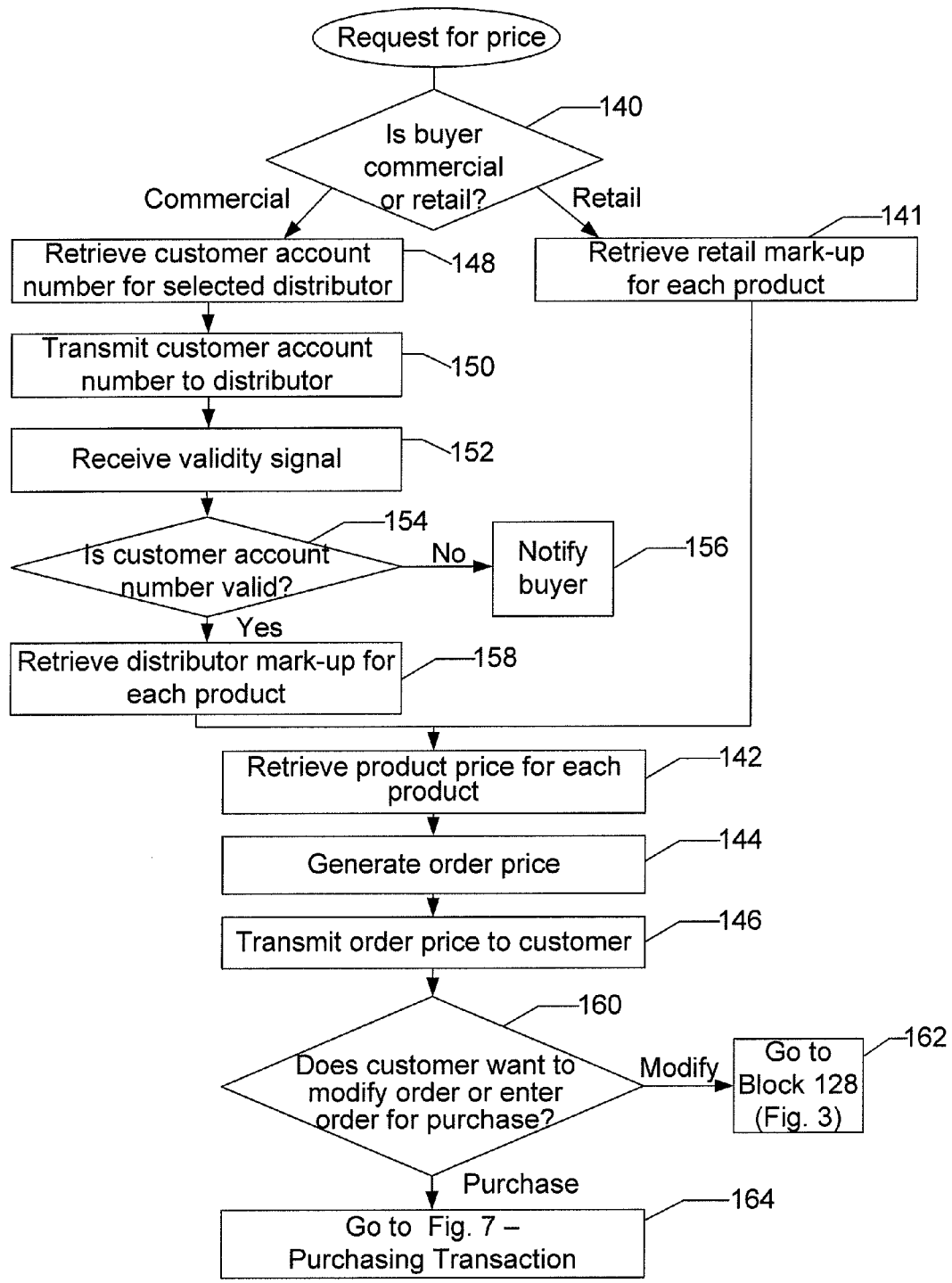
FIG. 5 is a flow chart further detailing one embodiment of the request for price process.

Referring to FIG. 5, if the request is an RFP, then the host system 14 determines if the customer 18 is a commercial customer or a retail customer based on the customer identification 64 (Block 140). Any number of methods or information within the customer identification 64 may be utilized to make this determination. For example, the host system 14 may identify the customer 18 as a commercial customer when the customer identification 64 includes a distributor identification and a customer account number for the identified distributor. Alternatively, for example, the host system 14 may identify the customer 18 as a retail customer when the customer identification includes a credit card account number or no account number at all.

If the customer 18 is identified as a retail customer, then the host system 14 and, in one embodiment depicted in FIG. 4, an order placement component 72 retrieves a retail mark-up and a product price from the database server 42 and combines them into a customer price for each product in the order. (Blocks 141 and 142). The host system 14 then generates the order price (Block 144).

Alternatively, if the customer 18 is identified as a commercial customer, then the host system 14 retrieves the customer account number for the distributor from the customer identification 64, or from the database server 42 if it has been previously stored (Block 148). The host system 14 then transmits the customer account number to the distributor for acknowledgment of the validity of the customer account number (Block 150). The host system 14 and, in one embodiment of FIG. 4, the receiver component 70 then receives a signal from the distributor indicating the validity of the customer account number (Block 152). The signal may also indicate that the customer is in good standing, i.e. has not exceeded their credit limit, with the distributor. The host system 14 then determines if the signal from the distributor indicates acceptance or rejection of the customer account number (Block 154). If the signal rejects the customer account number, then the host system 14 notifies the customer 18 (Block 156), who may be given one or more options such as to enter another customer account number, to modify the order to specify another distributor and customer account number, or to obtain a retail price. If the signal indicates acceptance of the customer account number, then the order placement component 72 retrieves a distributor-specific mark-up and a product price from the database server 42, such as from the product code/mark-up database 46 and the product/product price database 44, for each product in the order (Blocks 158 and 142, respectively). The host system 14 then calculates the customer price and generates the order price (Block 144). The customer price is a function of the product price and distributor-specific mark-up. The order price is the sum of the customer price times the product quantity for each product in the order. The host system 14 then transmits the order price to the customer 18 (Block 146).

Along with the transmission of the order price (Block 146), the host system 14 may allow the customer 18 to indicate whether or not they would like to modify the order (Block 160). For example, the customer 18 may decide to alter the order quantity after seeing the order price, or the customer may decide to add or delete products from the order. If the host system 14 receives an indication for an order modification, then the host system returns the customer 18 to Block 128 to reconfigure and resubmit the order (Block 162). If the host system 14 receives an indication from the customer 18 to purchase the products identified in the order, then the host system stores a copy of the order in the product order database 62 and proceeds with a purchasing order transaction (Block 164 and FIG. 7).

Figure 6:
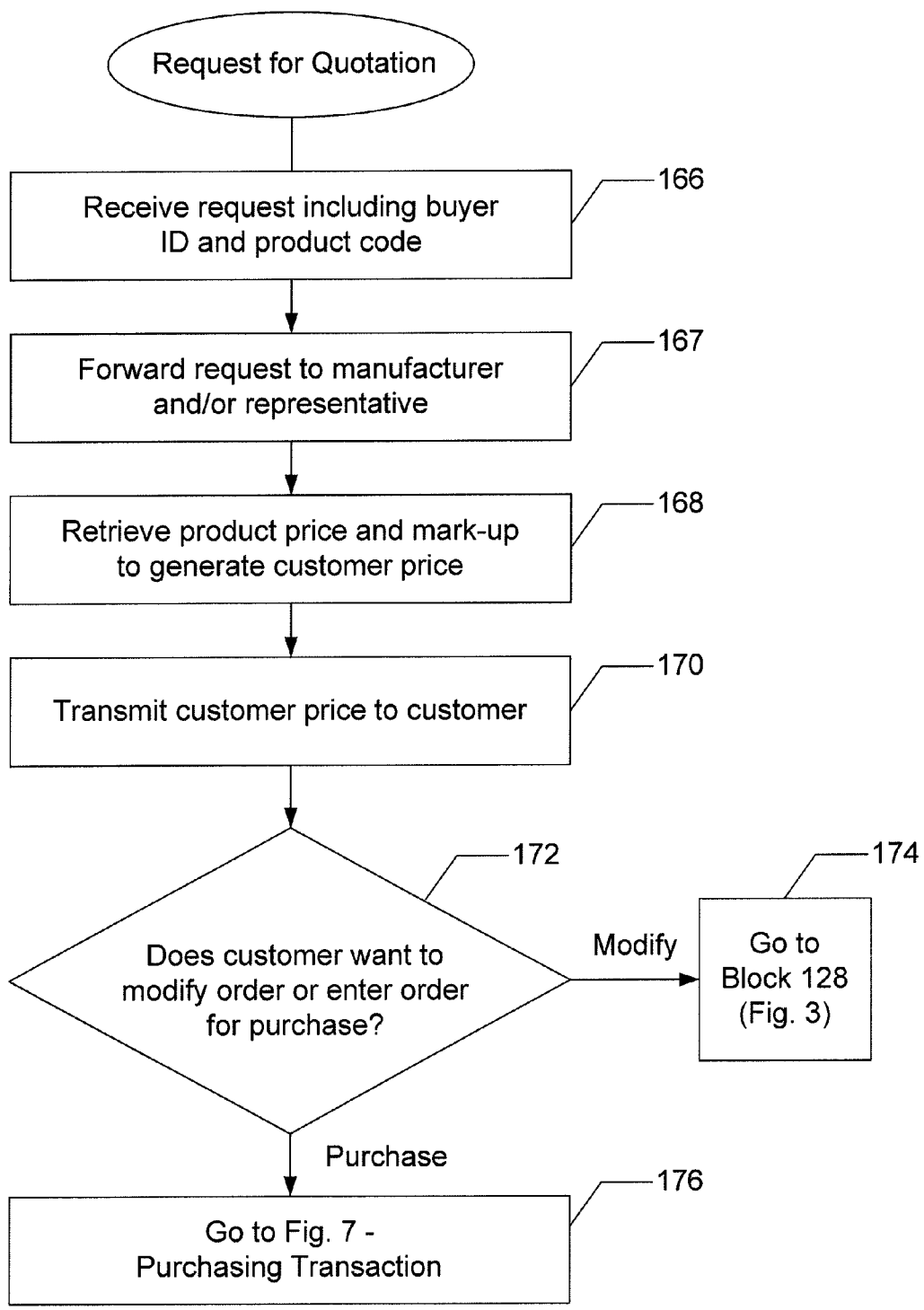
FIG. 6 is a flow chart further detailing one embodiment of the request for quotation process.

Referring to FIG. 6, if the received request is an RFQ (Block 166), then the host system 14 transmits the request to the manufacturer's representative 26 with notification to the manufacturer 18 (Block 167). Alternatively, the host system 14 may transmit the RFQ to the manufacturer 28, who then forwards the RFQ to the appropriate manufacturer's representative 26. In either case, the manufacturer 28 then evaluates the RFQ and provides a customer price for each product and forwards the RFQ to the manufacturer's representative 26 for approval. Alternately, the host system 14 may provide a suggested customer price based on predefined guidelines for a product price and a predefined mark-up, such as by varying the product price or predefined mark-up based on quantity, dollar amount of the order, the customer, etc (Block 168). The manufacturer's representative 26 reviews the RFQ to insure that the request does not conflict with other projects that the manufacturer's representative may already be working on with other customers. For example, a number of contractors may competitively bid for the same project, and if the manufacturer's representative 26 is already working with one contractor, the rep may not want to give a different price quote to the competing contractor, or the rep may not want to give any quote at all to the competing contractor. Once the rep 26 reviews the RFQ, a notice of a rejection or of an approval, with the quoted customer price, is returned to the customer 18 from the rep or through the manufacturer 28 or through the host system 14, with a copy being stored in the price/quote database 60 (Block 170, FIG. 1).

The quotation includes an order price, which is the sum of the customer price times the number of products for each product in the order. The customer price is a function of the product price and a quotation-specific mark-up for each product in the order. The quotation-specific mark-up may depend on the product price, a distributor-specific mark-up, the distributor, the product quantity, the product, the customer, the manufacturer's representative, and other similar variables that affect a customer price. As mentioned above, the quotation-specific mark-up may be predetermined and automatically selected by the host system 14 based on quantitive factors such as product quantity, product price, customer identification, etc.

The host system 14 then prompts the customer 18 about modifying the RFQ or placing an order for purchase (Block 172). If the host system 14 receives an indication from the customer 18 to modify the order, then the host system returns the customer to Block 128 (FIG. 3) to modify the order (Block 174). If the host system 14 receives purchase indication from the customer 18, then the host system stores a copy of the order in the product order database 62 (FIG. 1) and initiates a purchasing transaction (Block 176) (and see FIG. 7).

Figure 7:
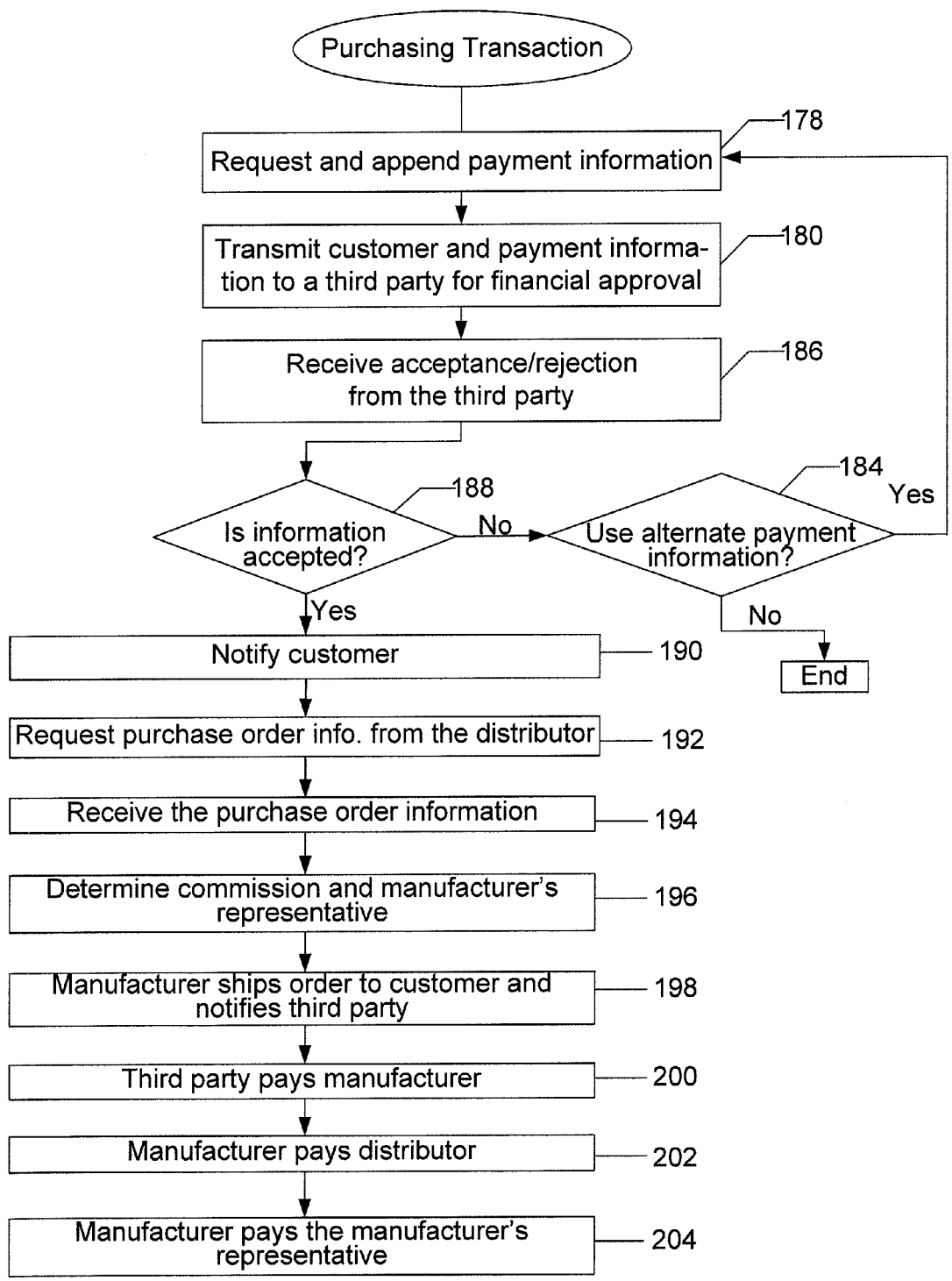
FIG. 7 is a flow chart detailing one embodiment of a product order transaction process.

Referring to FIG. 7, upon receiving a purchasing request for the order from the customer 18, the host system 14 may solicit financial approval from the distributor 24 as described by co-pending U.S. patent application Ser. No. 09/662,398 filed Sep. 14, 2000 by William F. Harris, the contents of which are incorporated herein in their entirety. According to the present invention, however, the host system 14 permits the customer to remit payment by means of a credit card, debit card or any other financial account, such as a checking account, savings account, credit line or the like, maintained by or on behalf of the customer by a third party 25, such as a bank or other financial institution. In this regard, the host system 14 solicits payment information from the customer 18 (Block 178). The payment information generally includes the customer account number and, in some instances, the third party 25 with whom the account is maintained. In a common example in which the customer elects to pay via a credit card account, the customer would provide the type of credit card (e.g., Visa, MasterCard, American Express, Discover, etc.), the account number and the date of expiration. The host system 14 updates the product order database 62 and then transmits a request for financial approval to the entity that maintains the account from which the customer wishes to pay or a representative of the entity that maintains the customer account (Block 180). In one example in which a customer elects to pay via a credit card account, the host system 14 may transmit a request for financial approval, including the order price and the name or merchant identification number of the manufacturer, to a credit card clearinghouse which provides transaction authorization for the credit card account of the customer, as known to those skilled in the art. If the customer is determined to have sufficient credit or to otherwise be capable of paying for the order, a response is provided to the host system 14 and, in particular, to the receiver component 70 that authorizes payment to the manufacturer upon completion of the transaction (Block 186). Typically, an authorization number is also provided. If, however, the customer is deemed not to have sufficient credit or to otherwise be incapable of paying for the order, a response is provided to the host system 14 declining to authorize payment. In this instance, the customer may be provided the opportunity to enter alternative payment information such that the foregoing credit approval process is repeated (Block 184). Alternatively, the host system may transmit a message to the customer indicating that the transaction cannot be completed for failure to receive proper financial approval.

In instances in which payment has been authorized (Block 188), the customer may be notified (Block 190). Additionally, the host system 14 may also notify the distributor 24 of the impending order and request issuance of purchase order information, such as a purchase order number, to the host system 14 and, in turn, to the manufacturer (Block 192). The distributor will then provide the host system 14 and, in turn, the manufacturer with purchase order information, typically including a purchase order number (Block 194). Further, upon determining that the customer and payment information is accepted (Block 188), the host system 14 and, more generally in conjunction with the embodiment of FIG. 4, a commission component 78 may calculate a commission to a manufacturer's representative 26 associated with the order (Block 196). In order to determine the proper manufacturer's representative 26, the commission component 78 preferably utilizes the customer identification 64 to determine a location of the customer 18. The commission component 78 associates the customer location with a territory, such as by using the customer's zip code, and associates the territory with a particular manufacturer's representative 26 using the information in the territory manufacturer's representative database 48 (FIG. 1). Alternately, the distributor 24 may identify the manufacturer's representative to receive the commission. Further, the commission component 78 may determine and store the commission utilizing a predetermined commission function in the commission database 52. The commission is determined by a commission function that generally includes a commission percentage multiplied by the distributor price (representing the difference between the customer price for a product and the distributor's gross profit that is paid to the distributor by the manufacturer as further described below), where the commission percentage is based on the distributor and/or the manufacturer's representative and/or the manufacturer. Alternatively, the commission database 52 may store a commission rate that is associated with each product, or with the identified manufacturer's representative, and applied to each product in the order or to the whole order to determine the commission. The host system 14 may also notify the manufacturer's representative of the impending order.

After receiving the purchase order number, the manufacturer 28 and, more generally, the order fulfillment component 76 of the embodiment of the host system 14 depicted in FIG. 4 ships the products specified in the order directly to the customer 18 and confirms shipment to the entity that will provide payment, such as a credit card clearinghouse, and provides the authorization number that was previously provided such that payment can be made to the manufacturer (Block 198). Preferably, the manufacturer 28 first reviews and approves the product order prior to shipment of the product. For example, the manufacturer 28 may not approve of a product order that directs a product to be shipped to a country subject to a government imposed boycott. Moreover, the shipment is generally accompanied by a purchase order bearing the number provided by the distributor.

The entity that maintains the financial account of the customer, or a representative thereof, may transfer funds to the manufacturer or, more typically, to an account established by or on behalf of the manufacturer at any stage of this process, typically upon request of the manufacturer. In one embodiment, however, the entity that maintains the financial account of the customer, or a representative thereof, transfers funds to the manufacturer or, more typically, to an account established by or on behalf of the manufacturer upon receipt of a notice confirming shipment and providing the authorization number, (Block 200). In the example in which the customer desires to pay via a credit card, the host system can advise the credit card clearinghouse of order shipment and provide the authorization number that was previously provided. The credit card clearinghouse can then arrange to transfer funds from the customer's account to an account of the manufacturer.

Once the manufacturer has received payment, the manufacturer 28 and, more generally, the order fulfillment component 76, arranges for payment of the distributor 24 (Block 202). In this regard, the manufacturer generally pays the distributor the distributor amount that has been defined in advance, such as by the distributor database 38. By way of example, the manufacturer may have established the customer price to be $20 and the distributor price to be $18. As such, the manufacturer would receive $20 and then pay the distributor the difference between the customer price ($20) and the distributor price ($18). This difference would be $2 in this example and would represent the gross profit of the distributor. In comparison to a comparable example provided above in conjunction with a traditional sales/distribution process, the customer pays $20 which is split into $18 for the manufacturer and $2 in gross profits for the distributor in each case, but the flow of money through the system and method of the present invention differs in that the manufacturer receives payment from the customer and to then performs the necessary accounting and pays the distributor its net profit while retaining the remainder for the manufacturer.

While the manufacturer can pay the distributor on an order by order basis, the manufacturer can pay the distributor on a monthly or other basis. Likewise, the manufacturer and, more typically, the commission component 78 of the embodiment of FIG. 4, may pay the manufacturer's representative for the order (Block 204). Thus, the distributor and manufacturer's representative may be paid the same amount as if the sale had been consummated in a conventional fashion with the customer purchasing from the distributor who then ships the product and collects payment. Accordingly, although the manufacturer is engaged in direct marketing, the distributor and manufacturer's representative participate financially in the same manner as in a conventional sale and therefore should remain loyal to the manufacturer.

The processes and methods described above are presented in a preferred arrangement. The various steps may be combined, some steps may be eliminated, and/or the order of the steps may be changed and still be within the system and method of the present invention.

Figure 8:
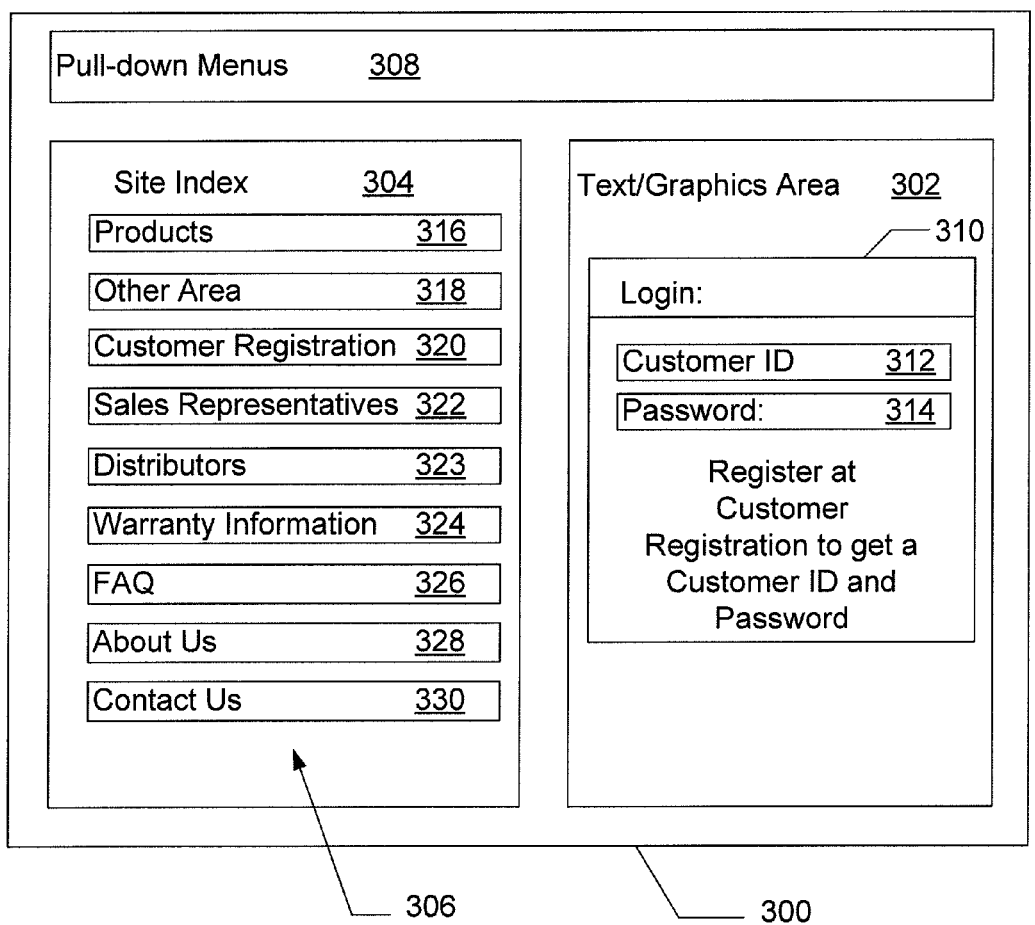
FIG. 8 is a schematic representation of one embodiment of a home page of a website for receiving a quotation and placing a product order.

Referring to FIG. 8, an exemplary manufacturer-specific website 15 includes a home page 300 having a text/graphics area 302 for displaying written and graphical pictorial information welcoming the customer to the site and discussing the manufacturer and the manufacturer's products. The home page 300 also includes a site index 304 having a plurality of navigation buttons 306. Further, the home page 300 includes a plurality of pull-down menus 308 that drill-down to the various pages available within the website.

The home page 300 may initially present the customer with a login popup menu 310, requesting a customer identification 312 and a password 314. The customer identification) 312 may be a unique alpha and/or numeric code or biometric data associated with the customer, while the password is a unique alpha and/or numeric code that verifies the identity of the customer. Both the customer identification 312 and password 314 may be compared with an authentic customer identification and password previously-stored in the customer database 55. The customer identification 312 may be the same as, or may be a part of, the customer identification 64 used in the request process as described regarding Block 104 (FIG. 2) and Block 132 (FIG. 3). By requesting a customer identification 312 and password 314, the host system 14 performs an information gathering function that enables recognition of the customer as, for example, a contractor, distributor, manufacturer's representative or retail customer, and to otherwise customize the presentation of the forthcoming web pages. Alternately, as described above, a login may not be required.

The plurality of navigation buttons 306 include direct links to areas of interest to the typical customer. For example, typical navigation buttons include: a product button 316 for further information on product areas and or specific products; a order area 318 for linking to order entry web pages including web pages soliciting entry of a credit card or other account information from which to make payment; a customer registration button 320 for entering customer information for storage in the customer database 55; a sales representative button 322 for information on the plurality of manufacturer's representatives 26; a distributor button 323 for information on the plurality of distributors 24; a warranty information button 324 for information on product warranties; a frequently asked questions (FAQ) button 326 for information in response to typical customer questions; an about us button 328 for information on the manufacturer 28; and a contact us button 330 for information on contacting the manufacturer 28 and or administrator of the host system 14.

Figure 9:
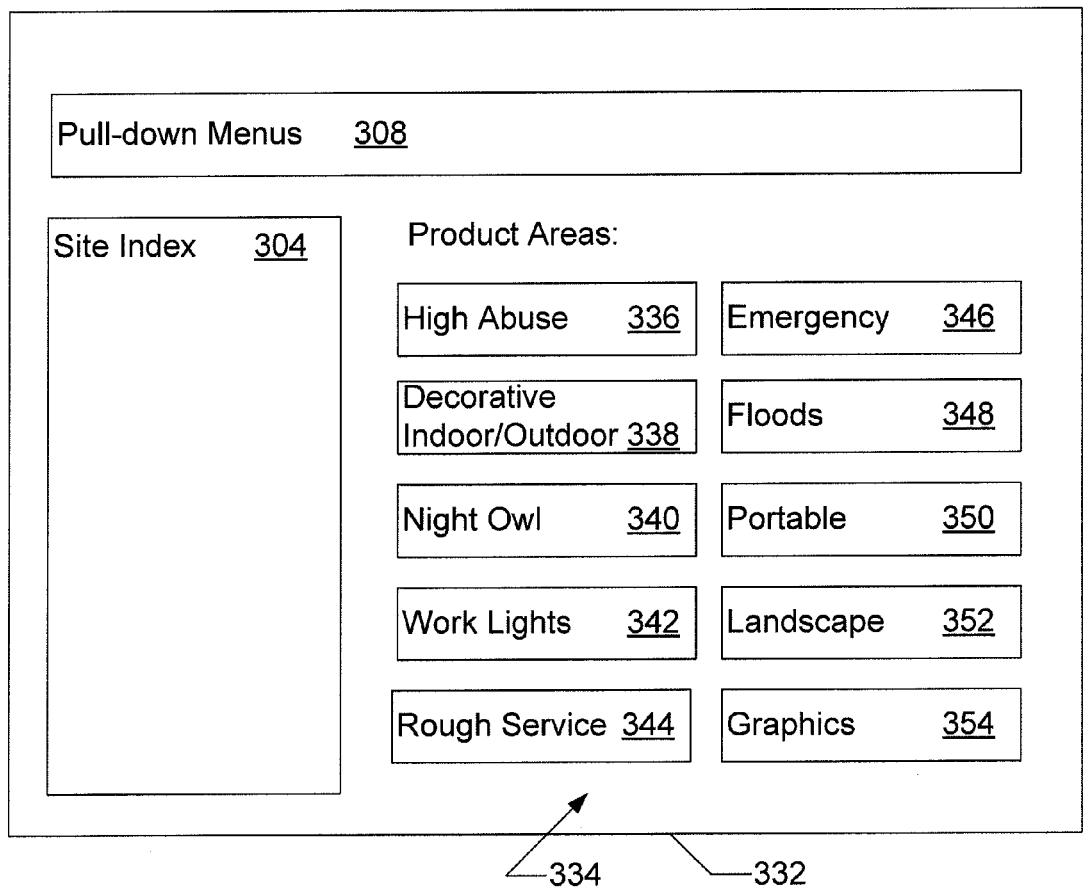
FIG. 9 is a schematic representation of one embodiment of a product area web page with various types of products available from a manufacturer.

In reviewing product information the customer 18 may select the products button 316, and be presented with a product areas page 332 displaying the various type of products 334 available from the manufacturer 28 as shown in FIG. 9. For example, typical product areas offered by manufacturer W. F. Harris Lighting may include: High Abuse 336; Decorative Indoor/Outdoor 338; Night Owl 340; Work Lights 342; Rough Service 344; Emergency 346; Floods 348; Portable 350; Landscape 352; and Graphics 354, among others.

Figure 10:
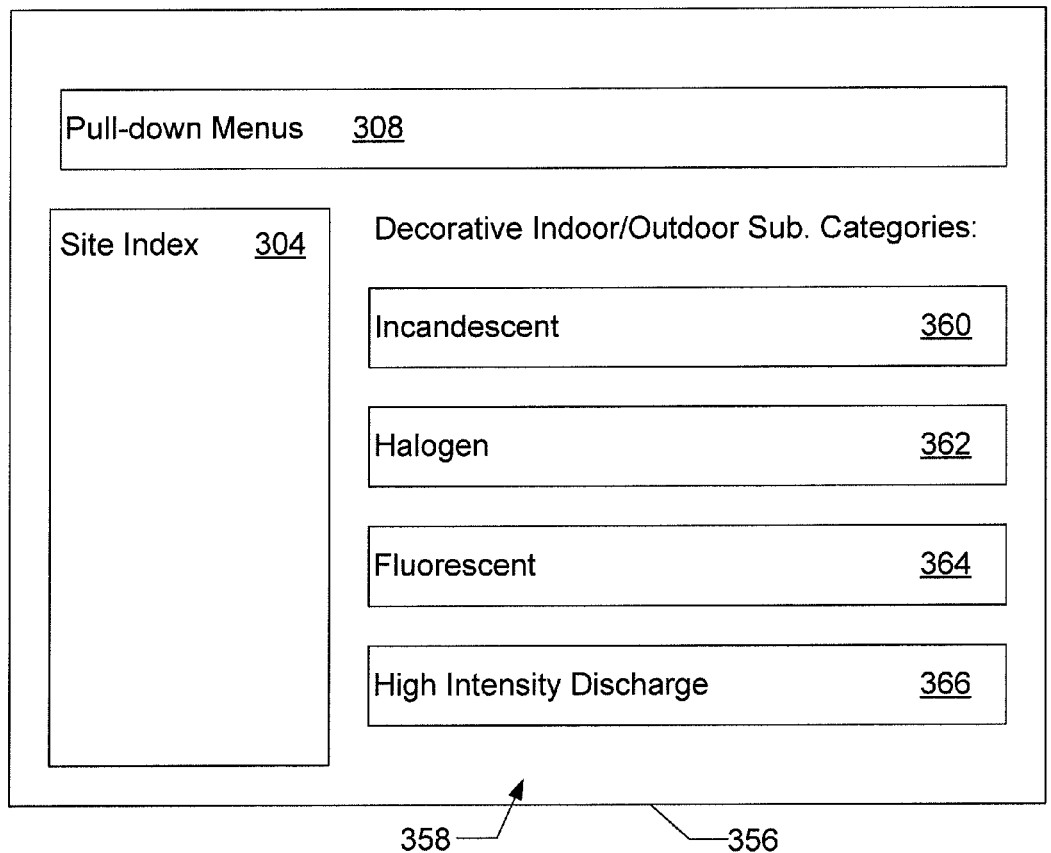
FIG. 10 is a schematic representation of one embodiment of a product area sub-category page with various sub-categories for a select type of product.

Referring to FIG. 10, upon selecting one of the various types of products 334, the customer 18 is presented with a product area sub-category page 356 including product sub-categories 358, which are specific for each of the types of products 334. For example, the sub-categories 358 for the decorative indoor/outdoor product area 338 may include: incandescent 360; halogen 362; fluorescent 364; and high intensity discharge (HID) 366, among others.

Figure 11:
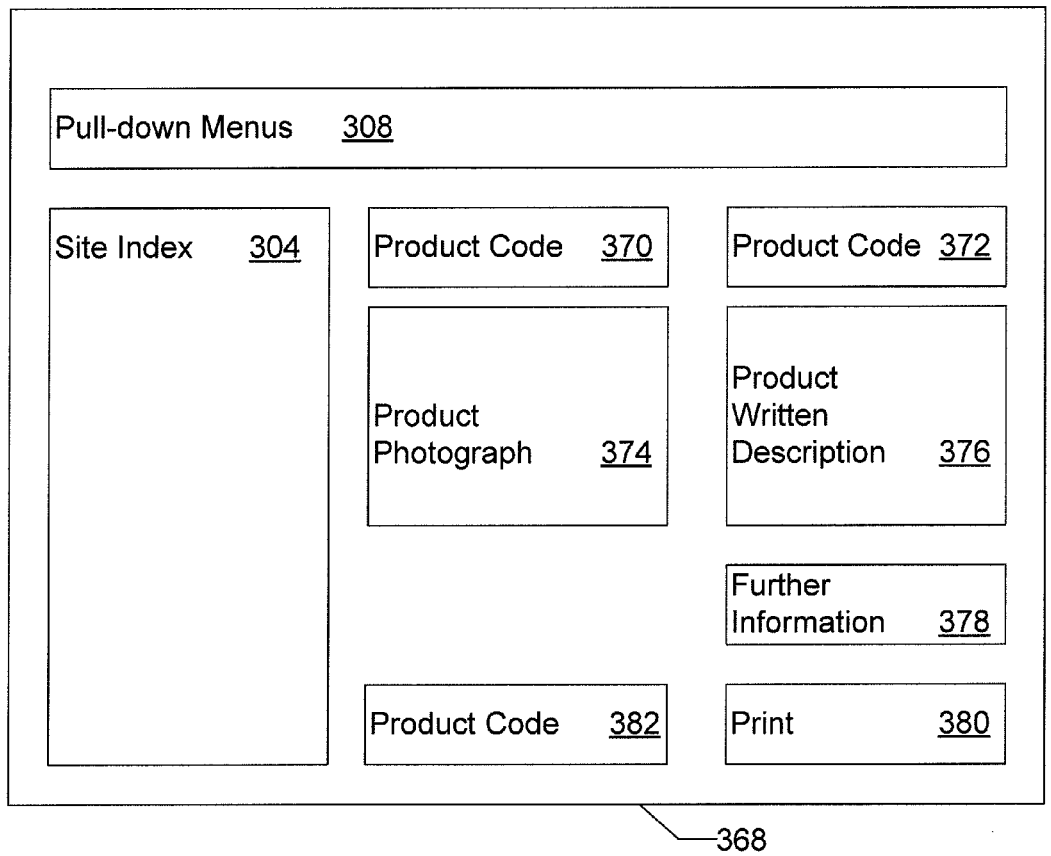
FIG. 11 is a schematic representation of one embodiment of a product page displaying various information relative to a selected product.

Referring to FIG. 11, upon selecting one of the product sub-categories 358, the customer 18 is presented with a product page 368 that includes information on one or a plurality of products categorized under the selected sub-category. For example, the product page 368 may include a product name 370 and an associated product code 372 assigned to the product by the manufacturer 28. Further, the product page 368 may include: a product photograph 374 or other image/representation of the product; a product written description 376 describing the product; a further information button 378 to obtain further detailed images or written description or specifications on the product; a print button 380 to print the product page 368; and an order button 382 to initiate the order process.

The web pages described above are for a preferred embodiment. Other embodiments including modifications, additions and/or deletions to the above defined pages may be implemented and still be within the system and method of the present invention.

Thus, the system and method disclosed herein preferably includes a web-based system and method for a manufacturer to market and sell for profit or exposure its manufactured and/or assembled products on its exclusive website. The products are sold in cooperation with distributors using mutually agreed-upon or otherwise derived individual or overall predefined mark-ups. The customer prices may be accessed by a customer, where the distributor is customer-selected or automatically determined from customer information. Further, upon receiving an order, an agent or manufacturer's representative associated with the order is credited with a commission based on the order and/or the customer and/or the account type. Typically, the commission is determined based on a commission rate according to a standing agreement in effect between the manufacturer and agent/representative at the time the commission is calculated. Therefore, the system and method allows a customer to place an order through a manufacturer's website, using a customer- or automatically-selected distributor and crediting a manufacturer's representative, thereby providing incremental sales and marketing that benefit the manufacturer, distributor and manufacturer's representative. Moreover, by permitting payment by credit card or other financial account maintained by or on behalf of the customer with a third party 25, payment for the order is also facilitated in a manner that is intuitive to the customer and that results in prompt payment to the manufacturer.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for generating an order for a product, comprising:
   receiving requests to order a product from a customer that include a product code that identifies the product;
   receiving financial authorization from a third party regarding customer payment for the product;
   retrieving information for the product, wherein retrieving the information comprises:
      retrieving a product price for the product; and
      retrieving at least two distributor-specific mark-ups for the product, wherein the at least two distributor-specific mark-ups are associated with at least two different distributors of the product;
   calculating, using a processor, a customer price associated with each of the at least two distributor-specific mark-ups;
   displaying simultaneously the customer price associated with each of the at least two distributor-specific mark-ups;
   receiving a selection of at least one customer price that is being displayed;
   placing an order from the manufacturer of the product based upon the at least one customer price that was selected; and
   completing a purchase of the product in accordance with the order, including arranging for shipping by the manufacturer and payment of a portion of the at least one customer price to a distributor of the at least two different distributors that is associated with the at least one customer price, even though the order is originated, received and fulfilled in a manner independent of the distributor.

2. A method according to claim 1 wherein completing the purchase further comprises receiving payment in an account of the manufacturer for the product and thereafter paying a portion of the payment to the distributor.

3. A method according to claim 1 further comprising obtaining purchase order information from the distributor and thereafter completing the purchase of the product in association with the purchase order information obtained from the distributor even though the order is originated, received and fulfilled in a manner independent of the distributor.

4. A method according to claim 3 wherein receiving financial authorization from a third party comprises receiving authorization that the customer is capable of paying for the product from a financial account maintained by or on behalf of the customer.

5. A method according to claim 1 further comprising providing a commission to an agent associated with the manufacturer.

6. A system for generating an order for a product, comprising:
- a data storage medium that stores information for a product distributed by a plurality of distributors, wherein the information includes a plurality of customer prices that are each associated with the product and are each associated with a mark-up for a different distributor;
- a display screen that displays the plurality of customer prices;
- a receiver component that receives requests to order the product that is associated with one of the plurality of customer prices, wherein the request includes a product code that identifies the product and a distributor of the plurality of distributors;
- an order placement component that: (i) retrieves information for the product from the data storage medium, (ii) obtains purchase order information from the distributor, and (iii) uses the information to place an order from the manufacturer of the product; and
- an order fulfillment component that completes a purchase of the product in accordance with the order placed by the order placement component, including arranging for shipping by the manufacturer and in association with the purchase order information obtained from the distributor even though the order is originated, received and fulfilled in a manner independent of the distributor.

7. A server system according to claim 6 wherein said order placement component is further capable of obtaining a purchase order number.

8. A system according to claim 6 wherein said order fulfillment component is further capable of arranging for payment of the distributor even though the order is originated, received and fulfilled in a manner independent of the distributor.

9. A system according to claim 8 wherein said order fulfillment component is further capable of receiving payment in an account of the manufacturer for the product and thereafter arranging for payment of a portion of the payment to the distributor.

10. A system according to claim 6 wherein said receiver component is further capable of receiving financial authorization from a third party regarding customer payment for the ordered product prior to completing the purchase.

* * * * *